United States Patent [19]

Kuboyama

[11] Patent Number: 4,590,918

[45] Date of Patent: May 27, 1986

[54] HEAT GENERATING APPARATUS BY USE OF MULTISTAGE ROTARY MEANS

[76] Inventor: Nobuyoshi Kuboyama, 28-9-1, Shimomiyamori, Aza, Miyamori-Mura, Kamihei-Gun, Iwate-ken, Japan

[21] Appl. No.: 523,692

[22] Filed: Aug. 16, 1983

[30] Foreign Application Priority Data

Jul. 20, 1983 [JP] Japan ................. 58-132542

[51] Int. Cl.$^4$ .............................................. F24C 9/00
[52] U.S. Cl. ...................................................... 126/247
[58] Field of Search ................. 126/247; 122/26;
415/501, 199.1, 199.2, DIG. 3; 417/204;
237/12.1

[56] References Cited

U.S. PATENT DOCUMENTS

| | | | |
|---|---|---|---|
| 1,161,117 | 11/1915 | Ehrhart | 126/247 X |
| 2,434,804 | 1/1948 | Lagercrantz | 417/244 X |
| 2,683,448 | 7/1954 | Smith | 126/247 |
| 4,004,553 | 1/1977 | Stenstrom | 126/247 X |
| 4,025,225 | 5/1977 | Durant | 415/199.1 X |
| 4,319,408 | 3/1982 | Kuboyama | 126/247 X |

Primary Examiner—Randall L. Green
Attorney, Agent, or Firm—Thomas R. Morrison

[57] ABSTRACT

A heat generating apparatus by use of multistage rotary means comprises a tubular casing having an air suction inlet and an air discharge outlet, and two or more rotary means disposed on a multistage manner in said tubular casing. An air friction heat generating area is formed in a slight gap of a rotation area of each rotary means and a suctioned air is heated on each stage level while reducing or pressurizing the air pressure within the chamber at a continuously balanced level.

8 Claims, 6 Drawing Figures

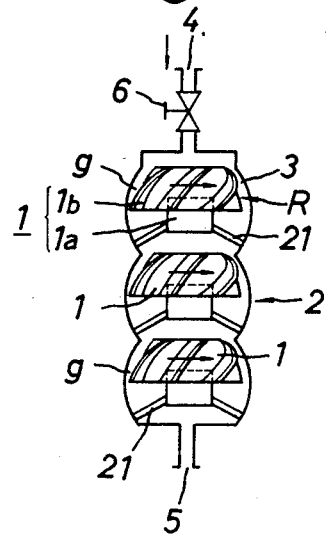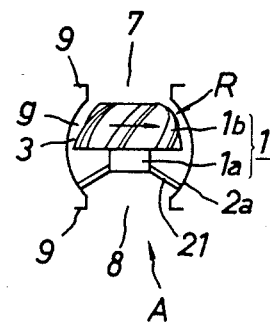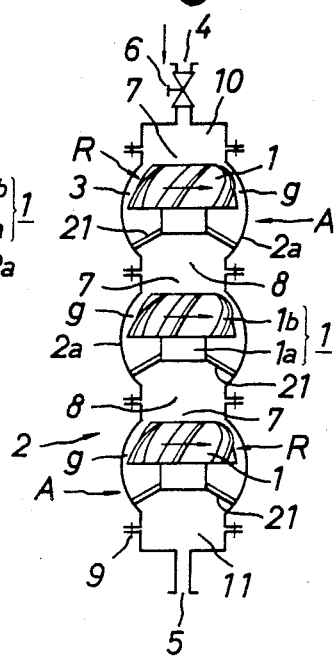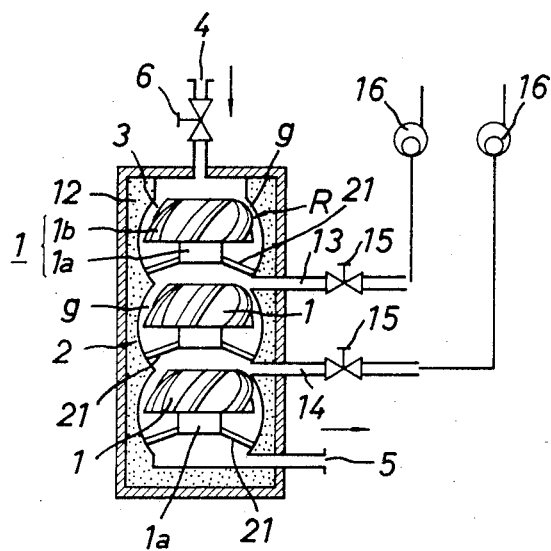

HEAT GENERATING APPARATUS BY USE OF MULTISTAGE ROTARY MEANS

BACKGROUND OF THE INVENTION

This invention relates to a heat generating apparatus by use of multistage rotary means, in which a plurality of rotary means are disposed in a multistage manner in a tubular casing, thereby a heat generating effect can be attained on each stage level.

The inventor has so far proposed a basic invention entitled "Heating process and its apparatus in reducing air pressure within a chamber at a balanced level" and other various related inventions. And, U.S. Pat. No. 4,319,408 has already been assigned to the aforesaid basic invention. Further, it should be noted that the inventor proposed a heating process in pressurizing air pressure within a chamber at a balanced level as disclosed in Japanese Unexamined Patent Publication No. 127779/1982.

The aforesaid inventions comprise rotary means for reducing or pressurizing air pressure within the chamber and a suction opening in which the rotary means is disposed, whereby the air pressure within the chamber is reduced or pressurized by continuous rotation of the rotary means, and a difference between the reduced or pressurized air pressure within the chamber and a normal air pressure thereoutside is maintained at a balanced level. Under such circumstances, air friction heat is generated in a gap between the suction opening and the rotary means by continuous rotation thereof, and can be used for drying or heating purposes.

That is to say, means for suctioning and discharging air within the chamber as well as means for generating air friction heat is formed by the rotary means having the suction opening, so that the drying or heating effect is greatly dependent upon whether or not the operational efficiency of the rotary means is superior. From this point of view, this invention has been accomplished.

BRIEF SUMMARY OF THE INVENTION

It is an object of this invention to provide a heat generating apparatus by use of multistage rotary means having the excellent air suction and discharge effect as well as the excellent heat generating effect, wherein two or more rotary means are disposed in a multistage manner in a tubular casing.

It is another object of this invention to provide a heat generating apparatus by use of multistage rotary means, in which an air friction heat area is formed in a slight gap of a rotation area of a plurality of rotary vanes of the rotary means, thereby a heat generating effect is attained on each stage level of the rotary means.

It is another object of this invention to provide a heat generating apparatus by use of multistage rotary means which can bring a preferred air suction and discharge effect by modifying optionally each vane's size, its number, its inclination and a distance between adjacent vanes.

It is another object of this invention to provide a heat generating apparatus by use of multistage rotary means, in which a plurality of air suction inlets are disposed in respective tubular casings on each stage, thereby heated air is taken out on each stage level of the rotary means.

It is a further object of this invention to provide a heat generating apparatus by use of multistage rotary means, in which each rotary means is one separate unit, thereby a plurality of such separate units are connected and fixed with each other.

These and other objects, features and advantages of this invention will become more apparent upon a reading of the following detailed specification and drawings.

BRIEF DESCRIPTION OF THE ACCOMPANYING DRAWINGS

FIG. 1 is a section view of an example of a heat generating apparatus by use of multistage rotary means according to this invention.

FIG. 2 is a section view of a single sturcture (one unit) of the heat generating apparatus, which comprises a rotary means and a tubular casing.

FIG. 3 is a section view of an example in which a plurality of units are perpendicularly connected with each other.

FIG. 4 is a section view of another example of this invention.

PREFERRED EXAMPLES OF THE INVENTION

Figure 5:
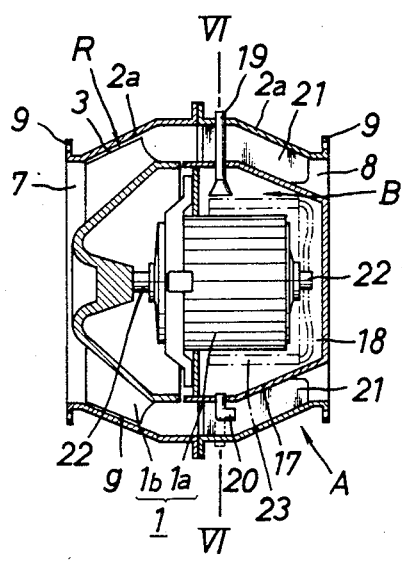
FIG. 5 is a detailed longitudinal section view of an example of a single structure comprising a rotary means and a tubular casing.
Figure 6:
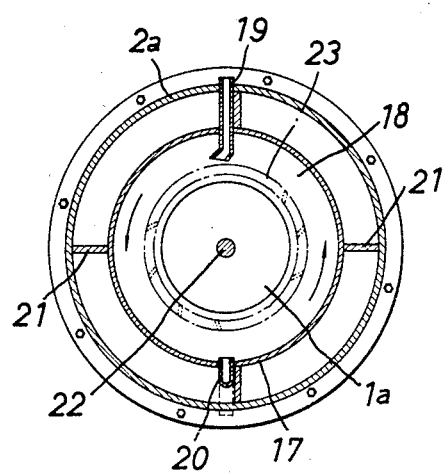
FIG. 6 is a section view taken on line VI—VI of FIG. 5.

Preferred examples of this invention will now be described with reference to the accompanying drawings.

Numeral 1 denotes a rotary means disposed within a tubular casing 2, and the rotary means 1 comprises an electric motor 1a and a plurality of rotary vanes 1b. Numeral 3 denotes an air friction heat generating area formed in a rotation area R of the rotary vanes 1b, in which the air friction heat is generated very effectively. That is, it is produced in a slight gap g formed between the tubular casing 2 and the rotary vanes 1b.

FIG. 1 shows a basic example of this invention, in which three rotary means 1 are disposed perpendicularly in the tubular casing 2 of a three-stage construction. Thus, a heat generating structure is also of three stages, in which each air friction heat generating area 3 having the gap g is formed in the rotation area R of the rotary vanes 1b of each rotary means 1.

According to the three-stage heat generating structure of this invention, the rotary vanes 1b of each rotary means 1 have the same size, same number, same inclination and same distance between adjacent vanes 1b, but it is optional to modify the size, number, inclination and distance of the adjacent rotary vanes 1b as necessity arises. More preferably, the output capacity of the first stage motor (the uppermost one in FIG. 1) is the highest, and that of the second stage and third stage motors is lower than that of the first stage one. However, this invention is not limited to such a gradual reduction of the motor's output capacity.

According to this example, the rotary vanes are directly connected to the motor 1a, but their speed can be changed by way of a speed change gear.

Further, it is optional to dispose a head of the rotary means 1 with right angle relative to a longitudinal axis of the tubular casing 2. In that case, the shape of the tubular casing 2 is of course modified.

Numeral 4 denotes an air suction inlet disposed in a front end of the tubular casing 2, while numeral 5 denotes an air discharge outlet disposed in a rear end thereof. Numeral 6 denotes a valve disposed in the air suction inlet 4. Preferably, the caliber of the suction inlet 4 and/or the discharge outlet 5 is designed smaller so that the air flow quantity may become smaller, thereby it becomes easy to reduce or pressurize the air pressure within the tubular casing at a constantly balanced level.

A function of the above first example will now be described.

When each motor 1a is energized, its rotary vanes 1b are rotated in an arrow direction as indicated in FIG. 1. When the valve 6 is opened, the air within the tubular casing 2 is discharged thereoutside from the air outlet 5 by way of the first, second and third stage rotary means.

Since the rotary means 1 is rotated with a high speed in the air friction heat generating area 3 formed by the gap g within the rotation area R, the air retaining in the gap g increases the temperature to a higher degree due to an intense air friction effect, thereby a high temperature air is produced. In the meanwhile, since the air pressure within the tubular casing 2 is maintained at a reduced balanced level due to the air suction and discharge function, the heat generating effect is very high. In other words, the air pressure reduction is maintained at a continuously balanced level, namely in a dynamic state, in the condition that the air is constantly suctioned (the valve 6 is opened) and discharged. And, as the stage level of the rotary means 1 is lower, the heat generating effect becomes higher.

On the other hand, the condition that the valve 6 is sealed will be described. Under such circumstances, when the motor 1a is actuated and the rotary vanes 1b are rotated, the air within the tubular casing 2 is discharged thereoutside and the air pressure therewithin is reduced gradually. After a short lapse of time, a difference between a reduced air pressure within the casing 2 and a normal air pressure thereoutside is maintained at a balanced level. After the air within the casing 2 has reached a high temperature by stimulating fully the air friction heat generating effect, it is possible to maintain the air pressure within the casing 2 at a reduced balanced level even if the valve is opened and further to discharge the high temperature air continuously from the air outlet 5.

Further, the temperature distribution of the air friction heat becomes higher as the stage level of the friction heat generating area 3 becomes lower.

Accordingly, when the tubular casing 2 is closed for the heat generating purpose, it can be used as a heat source. (The closed casing is not illustrated.) Further, when such a heat energy is discharged as described in FIG. 1, it may be used for various purposes such as room heating, drying, etc.

A second example of this invention will be described with reference to FIGS. 2 and 3. It shows a utility example of a single structure A. As shown in FIG. 2, the single structure A is such that one unit of the rotary means is disposed in the casing 2a and provided with an air introducing area 7 and an air discharging area 8. The casing 2a has connecting members 9 at two areas 7 and 8. Thus, if three units of the structure A are connected with each other by fixing adjacent connecting member 9 by means of screws 9a or the like, a heat generating apparatus by use of multistage rotary means can be obtained as shown in FIG. 3. Since the structure of each rotary means 1 and of each casing 2a is the same as described previously, its description will be omitted. On the uppermost casing 2a is fixedly mounted an air introducing member 10 having the air suction inlet 4, while on the lowermost casing is fixedly mounted an air discharging member 11 having the air discharge outlet 5. Accordingly, when all the rotary means 1 are actuated, the air friction heat is generated like the first example, thus enabling various industrial utilities.

Moreover, it is possible to produce a sufficient heat energy by making use of only one unit type structure A (as shown in FIG. 2) which is the simplest construction, provided that both the air introducing member 10 and the air discharging member 11 are together fixed with the structure A.

A fourth example of this invention will be described with regard to FIG. 4. As shown in FIG. 4, the tubular casing 1 is of a double construction, wherein a heat accumulating material 12 is disposed between the tubular casing 1 and a box-type casing in order to accumulate the heat energy generated in each friction heat generating area 3 and then produce a high temperature heat efficiently. The construction of the rotary means 1, rotation area R, gap g and air friction heat generating area 3 is the same as described previously, so that its description will be omitted.

In this example, the air discharge outlet 5 is disposed in a lower part of the casing 2, while two air discharge outlets 13, 14 are disposed separately between adjacent rotary means. Those two air discharge outlets 13, 14 are connected to suction means 16 of a rotary pump or the like by way of the valves 15, thereby the heat energy can be taken out on each stage level. Since the heat energy generated in the tubular casing 2 has a different temperature on each stage level, it can be utilized for respective purposes.

According to one aspect of this example, the valve 6 in the suction inlet 4 may be removed, and disposed in the discharge outlet 5. In this case (not illustrated), the air pressure within the tubular casing 2 can be pressurized at a balanced level while controlling the valve 6 disposed in the discharge outlet 5. And, the heat energy obtained by way of the two air discharge outlets 13, 14 can be supplied to a preferred place without installing the suction means 16.

FIG. 5 shows a detailed section view of a single structure A in the aforesaid examples. The single structure A in FIG. 5 comprises means B for cooling the motor 1a which consists of means for shielding bad effects due to the heat of the motor 1a and means for introducing outer cooling air, thereby the motor 1a can be actuated in a constantly normal manner despite occurrence of a high temperature air.

Numeral 17 denotes a cover body for covering and shielding exclusively the motor 1a and numeral 18 denotes a space 18 in which a pipe 19 for suctioning the cooling air is provided. One end of the pipe 19 is directed to the space 18 and another end thereof is directed outside the tubular casing 2a. Numeral 20 denotes a short pipe for discharging the heated air, one end of which is directed to the space 18 and another end of which is directed inside the tubular casing 2a.

Numeral 21 denotes a support for supporting the motor 1a and fixing it with the tubular casing 2a.

Further, it is possible to dispose a sirocco fan 23 as shown by a dot-and-dash line in order to discharge the over heat of the motor 1a. A center of the sirocco fan 23 is connected to a shaft 22 of the motor 1a. Thus, the heated air of the motor 1a can be prevented easily by rotating the sirocco fan 23. Further, the short pipe 20 can be extended through the tubular casing 2a as shown by a dot-and-dash line. The cooling air to be introduced into the space 18 may be replaced with a Freon gas or other cooling medium.

Accordingly, owing to the cooling means B, the motor 1a in the multistage rotary means is always placed in a cooling condition during its actuation, prevented from overheating and actuated stably for a long time.

According to one aspect of this invention, each one of a plurality of rotary means has a driving source (such as an electric motor) and rotary vanes, and an air friction heat is generated in a gap of a rotation area of the rotary vanes while reducing or pressurizing the air pressure within the chamber at a continuously balanced level. Further, the thus heated air can be taken out on the stage level of the rotary means. Still further, a desired heat energy can be produced by connecting a preferred number of a single structure (A) with each other. It should be noted that the heat energy produced by this invention is very clean and can be utilized for various purposes.

What is claimed is:

1. A heat generating apparatus by use of multistage rotary means comprising:
   a tubular casing having an air suction inlet and an air discharge outlet and at least first and second rotary means disposed in said tubular casing, said first rotary means receiving air from said air suction inlet and delivering air at a first different pressure to said second rotary means, said second rotary means delivering air at a second different pressure to said air discharge outlet, an air friction heat generating area formed by a slight gap between a rotation area of each of said first and second rotary means and said casing whereby suctioned air is heated in said air friction heat generating areas while reducing or pressurizing the air pressure within the casing at a continuously balanced level and means for controlling a volume of air flow through at least one of said inlet and said outlet to a volume of air flow effective to maintain said air pressure within said casing at said continuously balanced level and for discharging friction heated air from said air discharge outlet;
   each of said at least first and second rotary means including an electric motor and a predetermined number of rotary vanes;
   said at least first and second rotary means being disposed coaxially in said tubular casing; and
   each of said at least first and second rotary means being actuated by its respective electric motor.

2. The heat generating apparatus by use of multistage rotary means as claimed in claim 1, wherein said air discharge outlet is disposed between said at least first and second rotary means.

3. The heat generating apparatus by use of multistage rotary means as claimed in claim 1, wherein a first portion of said tubular casing about said first rotary means is identical to corresponding portions about each of the other rotary means, and said portions each include means for coaxially connecting all of said portions to each other to form said tubular casing.

4. The heat generating apparatus by use of multistage rotary means as claimed in claim 1, wherein said at least first and second rotary means further comprises a shielding body spaced from said electric motor to form a space between an outer circumference of said electric motor and said shielding body, a first pipe for suctioning a cooling medium into said space from outside said tubular casing and a second pipe for discharging heated air from said space within said shielding body into a space between said shielding body and said tubular casing.

5. A modular heat generating apparatus comprising:
   at least first and second substantially identical tubular casings connected together at a junction to form at least a two-stage apparatus;
   a rotary means in each of said tubular casings;
   said rotary means each including a rotation area;
   each of said casings being disposed adjacent its respective rotation area and forming a slight cap therewith;
   said slight gap forming an air friction heat generating area;
   an air introducing area in an upstream one of said first and second casings;
   an air discharging area in a downstream one of said first and second casings;
   an identical connecting member one each of said first and second identical tubular casings, said connecting members being effective to permit series connection of said first and second tubular casings to thereby permit air heated and pressurized in said upstream one of said first and second casings to be fed to said downstream one of said first and second casings wherein said air is further heated and pressurized; and
   means for controlling at least one of a flow of air into an upstream one of said tubular casings and a flow of air out of a downstream one of said tubular casings to a value which produces an air pressure within said tubular casings having a continuously balanced level and controls a discharge of friction heated air from said air discharge outlet;
   said rotary means each including an electric motor and a preferred number of rotary vanes;
   said rotary means being disposed coaxially in said tubular casing; and
   said rotary means each being actuated by its respective electric motor.

6. A modular apparatus according to claim 5 wherein said means for controlling includes means for constricting a flow of air into said upstream end whereby said continuously balanced level is a reduced air pressure.

7. A modular apparatus according to claim 5 wherein said means for controlling includes means for constricting a flow of air out of said downstream end whereby said continuously balanced level is an increased air pressure.

8. A modular apparatus according to claim 7, further comprising means for conveying heated and pressurized air from said junction between said first and second casings to an exterior of said apparatus.

* * * * *